United States Patent
Balasubramanian et al.

(10) Patent No.: US 9,052,979 B2
(45) Date of Patent: Jun. 9, 2015

(54) PROGRAM CODE LIBRARY SEARCHING AND SELECTION IN A NETWORKED COMPUTING ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/706,607

(22) Filed: Dec. 6, 2012

(65) Prior Publication Data

US 2014/0165032 A1 Jun. 12, 2014

(51) Int. Cl.
*G06F 9/44* (2006.01)

(52) U.S. Cl.
CPC .. *G06F 8/70* (2013.01); *G06F 8/71* (2013.01); *G06F 8/30* (2013.01)

(58) Field of Classification Search
CPC ..................................... G06F 8/30; G06F 8/71
USPC .................................................. 717/120, 106
See application file for complete search history.

(56) References Cited

U.S. PATENT DOCUMENTS

| 7,383,269 | B2 | 6/2008 | Swaminathan | |
|---|---|---|---|---|
| 7,831,608 | B2 * | 11/2010 | Aizenbud-Reshef et al. | 707/758 |
| 7,962,470 | B2 | 6/2011 | Degenkalb et al. | |
| 8,065,315 | B2 | 11/2011 | Rapp et al. | |
| 8,122,017 | B1 * | 2/2012 | Sung et al. | 707/723 |
| 2007/0299825 | A1 | 12/2007 | Rush et al. | |
| 2008/0201330 | A1 | 8/2008 | Bloesch | |
| 2009/0222429 | A1 * | 9/2009 | Aizenbud-Reshef et al. | 707/5 |
| 2010/0106705 | A1 | 4/2010 | Rush et al. | |
| 2012/0254835 | A1 * | 10/2012 | Muddu et al. | 717/121 |

OTHER PUBLICATIONS

Lazzarini Lemos et al, "A test-driven approach to code search and its application to the reuse of auxiliary functionality", Nov. 24, 2010.*

(Continued)

*Primary Examiner* — Phillip H Nguyen
(74) *Attorney, Agent, or Firm* — William E. Schiesser; Keohane & D'Alessandro PLLC; Maxime L. Barasch

(57) ABSTRACT

An approach for integrated development environment (IDE)-based program code library searching and selection in multiple programming languages in a networked computing environment is provided. In a typical embodiment, a search request (e.g., to locate a desired program code library) will be received in an IDE and parsed. The search request generally includes a set of annotations corresponding to at least one of: a primary program code language of the program code library, an alternate program code language of the program code library, or a method pair associated with the program code library. A search of at least one program code library repository will then be conducted based on the set of annotations, and a set of matching results will be generated. The set of matching results may include one or more program code libraries, and may be provided to a device hosting the IDE.

22 Claims, 5 Drawing Sheets

(56) References Cited

OTHER PUBLICATIONS

Fernandez-Luna et al., "COSME: A NetBeans IDE plugin as a team-centric alternative for search driven software development", 2010.*

Mell, P. et al., "The NIST Definition of Cloud Computing", National Institute of Standards and Technology, Information Technology Laboratory, Vers. 15, Oct. 7, 2009, 2 pages.

Maitland, J., "Keeping Control Isn't Easy", Chapter 4: Cloud-Based Infrastructure, SearchCloudComputing.com, 13 pages, Oct. 2009.

"About Koders", Koders.com, 4 pages. http://corp.koders.com/about/, May 16, 2012.

"Google Code Search FAQ", 4 pages. http://www.google.com/help/faq_codesearch.html, May 1, 2012.

* cited by examiner

PROGRAM CODE LIBRARY SEARCHING AND SELECTION IN A NETWORKED COMPUTING ENVIRONMENT

TECHNICAL FIELD

Embodiments of the present invention relate to program code library searching and selection. Specifically, embodiments of the present invention relate to an approach for integrated development environment (IDE)-based program code library searching and selection in a networked computing environment (e.g., a cloud computing environment).

BACKGROUND OF THE INVENTION

A code repository is typically a searchable, categorized, and/or Internet-accessible location that users may access to browse, search, and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time. A code library is a collection of resources used to develop software. Such resources may include pre-written code and subroutines, classes, values, or type specifications. Code libraries may contain program code and/or data that provide services to independent programs. Such an implementation allows for program code and/or data to be shared and changed in a modular fashion. Programmers may also occasionally move between various programming languages based on a project's requirements. Challenges may exist, however, to allow a programmer to rapidly locate program code library calls based on characteristics of other/multiple programming languages. Existing approaches typically rely on manual and/or disparate searching operations. Such approaches may be inefficient and/or inaccurate.

SUMMARY

In general, embodiments of the present invention provide an approach for integrated development environment (IDE)-based program code library searching and selection in multiple programming languages in a networked computing environment (e.g., a cloud computing environment). In a typical embodiment, a search request (e.g., to locate a desired program code library) will be received in an IDE and parsed. The search request generally comprises a set of annotations corresponding to at least one of: a primary program code language of the program code library, an alternate program code language of the program code library, or a method pair associated with the program code library. A search of at least one program code library repository will then be conducted based on the set of annotations, and a set of matching results will be generated. The set of matching results may include one or more program code libraries (e.g., based in one or more program code languages), and may be provided to a device hosting the IDE.

A first aspect of the present invention provides a computer-implemented method for searching for program code libraries in multiple programming languages in a networked computing environment, comprising: receiving, in a computer memory medium, a request to search at least one program code library repository associated with an integrated development environment (IDE) for a program code library, the request comprising a set of annotations corresponding to at least one of: a primary program code language of the program code library, an alternate program code language of the program code library, or a method pair associated with the program code library; searching, based on the set of annotations, the at least one program code library repository for the program code library; and providing a set of matching search results determined from the searching to a device hosting the IDE.

A second aspect of the present invention provides a system for searching for program code libraries in multiple programming languages in a networked computing environment, comprising: a memory medium comprising instructions; a bus coupled to the memory medium; and a processor coupled to the bus that when executing the instructions causes the system to: receive, in a computer memory medium, a request to search at least one program code library repository associated with an integrated development environment (IDE) for a program code library, the request comprising a set of annotations corresponding to at least one of: a primary program code language of the program code library, an alternate program code language of the program code library, or a method pair associated with the program code library; search, based on the set of annotations, the at least one program code library repository for the program code library; and provide, based on the search a set of matching search results to a device hosting the IDE.

A third aspect of the present invention provides a computer program product for searching for program code libraries in multiple programming languages in a networked computing environment, the computer program product comprising a computer readable storage media, and program instructions stored on the computer readable storage media, to: receive, in a computer memory medium, a request to search at least one program code library repository associated with an integrated development environment (IDE) for a program code library, the request comprising a set of annotations corresponding to at least one of: a primary program code language of the program code library, an alternate program code language of the program code library, or a method pair associated with the program code library; search, based on the set of annotations, the at least one program code library repository for the program code library; and provide, based on the search, a set of matching search results to a device hosting the IDE.

A fourth aspect of the present invention provides a method for deploying a system for searching for program code libraries in multiple programming languages in a networked computing environment, comprising: providing a computer infrastructure being operable to: receive, in a computer memory medium, a request to search at least one program code library repository associated with an integrated development environment (IDE) for a program code library, the request comprising a set of annotations corresponding to at least one of: a primary program code language of the program code library, an alternate program code language of the program code library, or a method pair associated with the program code library; search, based on the set of annotations, the at least one program code library repository for the program code library; and provide, based on the search, a set of matching search results to a device hosting the IDE.

BRIEF DESCRIPTION OF THE DRAWINGS

These and other features of this invention will be more readily understood from the following detailed description of the various aspects of the invention taken in conjunction with the accompanying drawings in which.

Figure 1:
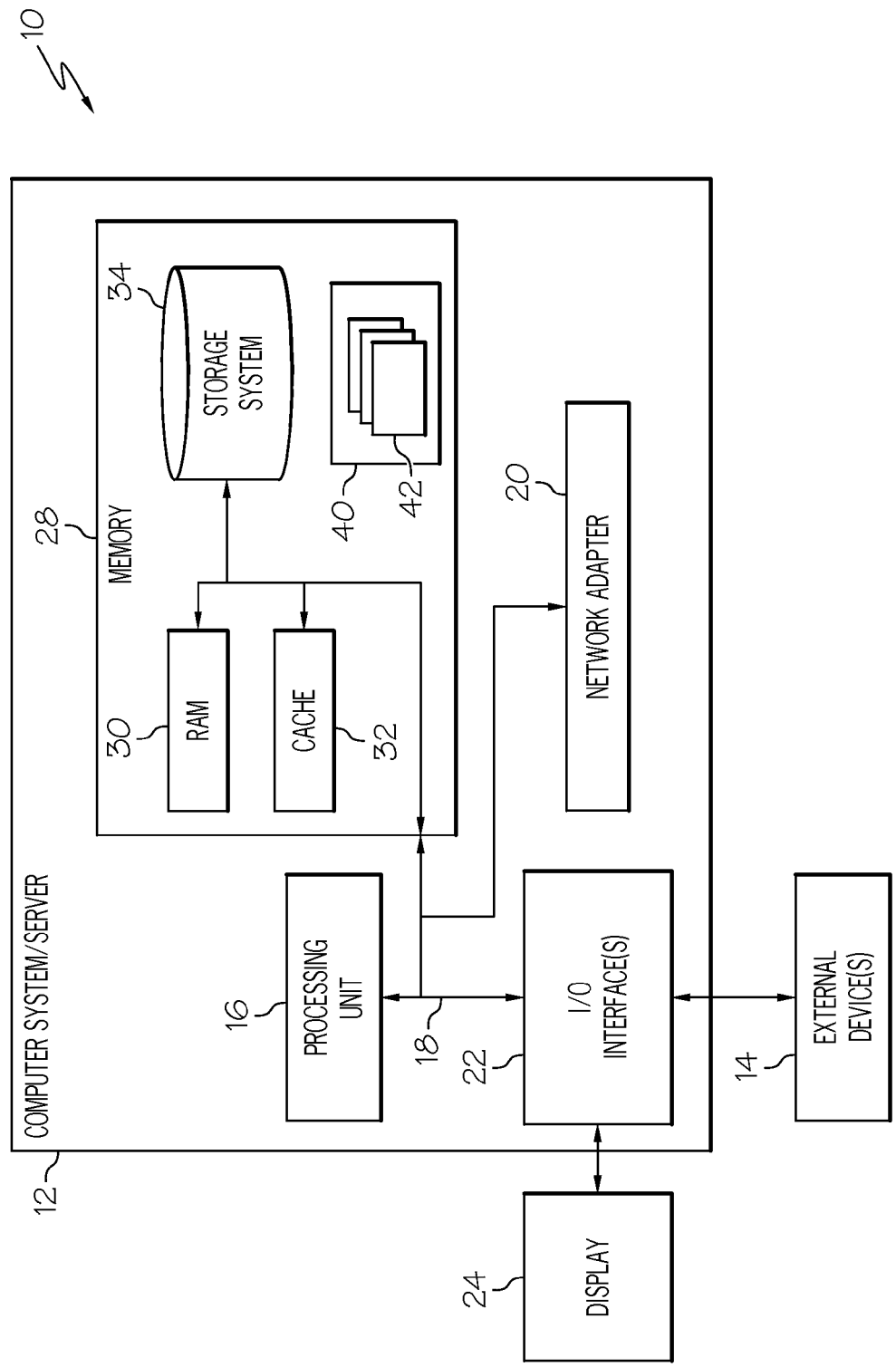
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for integrated development environment (IDE)-based program code library searching and selection in multiple programming languages in a networked computing environment (e.g., a cloud computing environment). In a typical embodiment, a search request (e.g., to locate a desired program code library) will be received in an IDE and parsed. The search request generally comprises a set of annotations corresponding to at least one of: a primary program code language of the program code library, an alternate program code language of the program code library, or a method pair associated with the program code library. A search of at least one program code library repository will then be conducted based on the set of annotations, and a set of matching results will be generated. The set of matching results may include one or more program code libraries (e.g., based in one or more program code languages), and may be provided to a device hosting the IDE.

In a typical embodiment, code repositories and integrated development environments (IDEs) are augmented to provide enhanced searching. In an alternate embodiment, the teachings recited herein may be implemented by search engines rather than development environments. The embodiments of the present invention may further augment annotation systems to support tag-based descriptions of methods and classes. Still yet, in embodiments in which source code is available in addition to runtime libraries, descriptive tags may be automatically generated using known search indexing methodology. Furthermore, searching is refined through the use of an expectation annotation. It is understood that embodiments of the present invention may utilize code annotations (e.g., to program code, methods, classes, etc.) to express related attributes. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program code library searching and selection program/utility 40, having a set (at least one) of program modules 42, may be stored in memory 28 by way of example, and not limitation, as well as an operating system, one or more application programs, other program modules, and program data. In general, program/utility 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
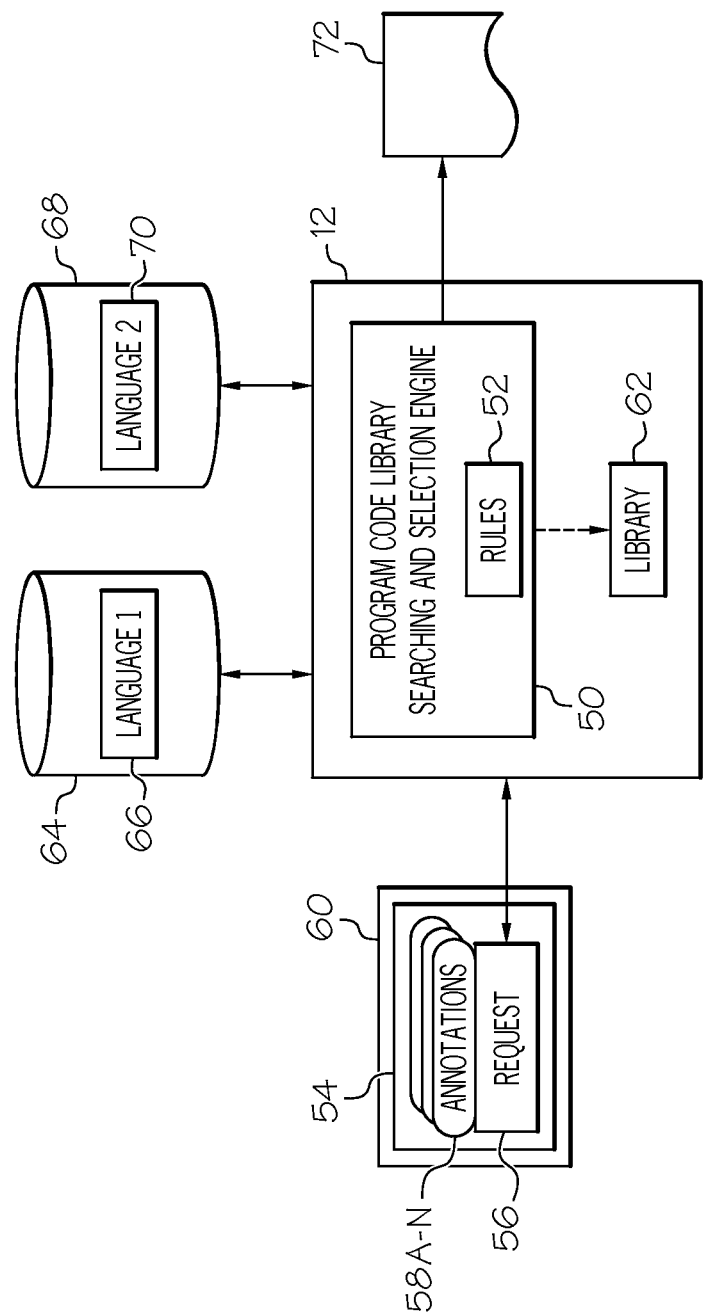
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a program code library searching and selection engine (engine 50). Rather, engine 50 could be loaded on a server (e.g., payment processing server) or server-capable device that communicates (e.g., wirelessly) with the clients to provide library searching and selection functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides library searching and selection functionality hereunder.

Along these lines, engine 50 may perform multiple functions similar to a general-purpose computer. Specifically, among other functions, engine 50 may (among other things): receive, in a computer memory medium (e.g., memory 28 of computer system 12), a request 56 to search at least one program code library repository 64 and 66 associated with an integrated development environment (IDE) 54 for a program code library 62, the request 56 comprising a set of annotations 58A-N corresponding to at least one of: a primary program code language 66 of the program code library 62, an alternate program code language 70, or a method pair; search, based on the set of annotations 58A-N, the at least one program code library repository 64 and 68 for the program code library 62; and provide, based on the search, a set of matching search results 72 to a device 60 hosting the IDE 54.

It is understood that the example shown in FIG. 2 is intended to be illustrative only. For example, engine 50 could be loaded on device 60, or operate on a separate system as shown. Along these lines, engine 50 may have access to IDE 54 to perform the functions recited hereunder. Alternatively, IDE 54 may be loaded on computer system 12. In such an implementation, request 56 and annotations 58A-N may be received by computer system 12. Regardless, it is understood that the specific architectural implementation shown in FIG. 2 is not intended to be limiting and that similar underlying functionality may be achieved with alternate architectures. For example, regardless of the specific architecture, a search request having annotation(s) for finding a desired program code library will be received (e.g., in computer memory), parsed/analyzed, and used to search for the desired program code library across multiple program code languages irrespective of the specific architecture and/or location of the system under which the foregoing functionality is implemented.

Figure 3:
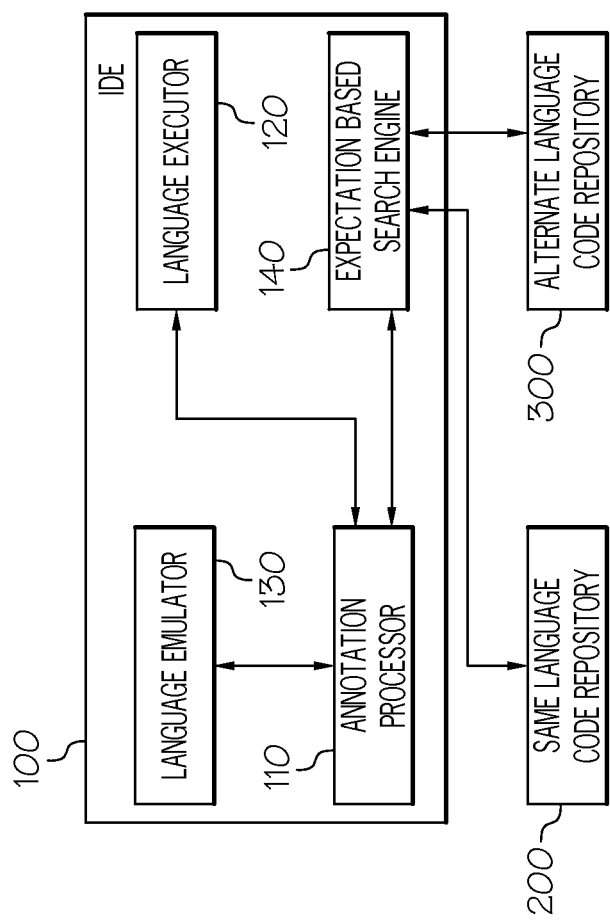
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via an IDE 100, code repositories 200 and 300 connected via connection 400. In one embodiment, connection 400 may represent a cloud network. Within IDE 100, annotation processor 110 may be configured to process a "@SameAs" and/or "@Substitute annotations." Processor 110 may utilize expectation-based search engine 140 for all searches. When using the "@SameAs" annotation, language executor 120 may be configured to execute the alternate method in the user specified language and returning output. Emulator 130 may be utilized with the "@Substitute" annotation to execute methods in the user specified language. Code repositories 200 and 300 are illustrative repositories used by search engine 140 to perform expectation-based searches.

Illustrative Embodiment

This section will describe various functions (e.g., via method, functions and/or modules) performed by engine 50 according to an illustrative example hereunder.
Annotation Processing Annotation Parsing with Helper: Under this method, a user may (for example) seek a library to perform a base 64 encoding of strings. For their application, the user may wish the return from the library call to also be a string. To initiate a search, the user may then enter the following into the code where the user wishes to make the library invocation:

@Description (base64,encode)
@Expect("hello"). Returns("aGVsbG8=")
@Signature("public String <method>String")

The above set of instructions may request the IDE to invoke a search of repositories for methods containing the terms base64 and decode. For matching methods, the IDE may then narrow down methods that are public, return a string object and expect a single string object as a parameter. Furthermore, if that method is passed a string of "hello", the return value from that method may be a string of "aGVsbG8=". The user may then be presented a list of matching methods and the libraries from which those methods belong.

To assist the developer who is already proficient with other programming languages, a new annotation may be provided to streamline the process. Using the method declared above, the user may write a temporary program in a language of choice with a base64 encoder, capture the output and append it into the annotation, or search for a web based encoder to use and capture output from. However, this may not be possible for all library invocations. To enable this functionality, a "SameAs" annotation may be introduced and an expect annotation may be modified to not require a return. The modified invocation may look like the following:

@Description (base64,encode)
@SameAs (lang="Java", method="java.lang.Base64.encode");
@Expect("hello")
@Signature("public String <method>String")

These instructions may direct the IDE to locate a method using various searching methods that match the method description. Instead of requiring the user to calculate the return value, the IDE may be configured to invoke a java Base64,encode method with a string of "hello" and to capture the return of that method and use during method searching.

Annotation Parsing Using Emulation: In another aspect of this approach, a developer may be searching for a method in a particular language but is willing to accept alternatives in a different language. Specifically, the developer may be willing to accept libraries that meet their expectation but are defined in a different language. To enable this approach, a new annotation may be provided. Using this annotation, the developer may specify that the expectation may be substituted with an implementation from one or more different languages.

@Description (base64,encode)
@Substitute (lang="Java C++ Perl")
@Expect("hello"). Returns("aGVsbG8=")
@Signature("public String <method>String")

These instructions direct the IDE to first exhaust searches for the expectation using the project's language. If no matches are found, the IDE may then expand the search to include the languages specified in the language attribute. If a match is found, then in one embodiment, the IDE may build a wrapper method in the project's language on top of the library language. When the wrapper method is called, the IDE may make use of an emulator to either interpret or link to the library language and execute the library method. In an alternate embodiment, the library provider may supply an execution environment for their library, in which case the wrapper simply uses the provider's environment to execute the method.

Combining Helper and Emulation: Another aspect of this approach utilizes a combination of a helper and emulation. The developer may specify both "@SameAs" and "@Substitute" annotations. In this case, the IDE may first use the helper to locate libraries in the same language as the project. If a match is not found, the IDE may then expand the search to include substitute libraries.
Language Execution Module This module may be called upon by the IDE to execute functions/methods and capture the return values. This module may be local to the IDE or may be available as a service call from the library repositories. The IDE, potentially with user input, may instruct this module how to construct the required classes and which methods to execute and capture the resulting output. Some methods may be static and not require any constructed classes, while others may be more complex and require construction and/or mock objects.
Emulation Module This module may be invoked by the IDE to: (1) create the wrapper method; and (2) emulate the library language during execution or invoke the method on the remote library environment. It is possible that the IDE may not be able to emulate every language specified by the developer. The IDE may download emulation modules from a central repository as required based on a "@Substitute" annotation. Alternatively, the IDE may ignore a language due to the lack of an emulation module.

Figure 4:
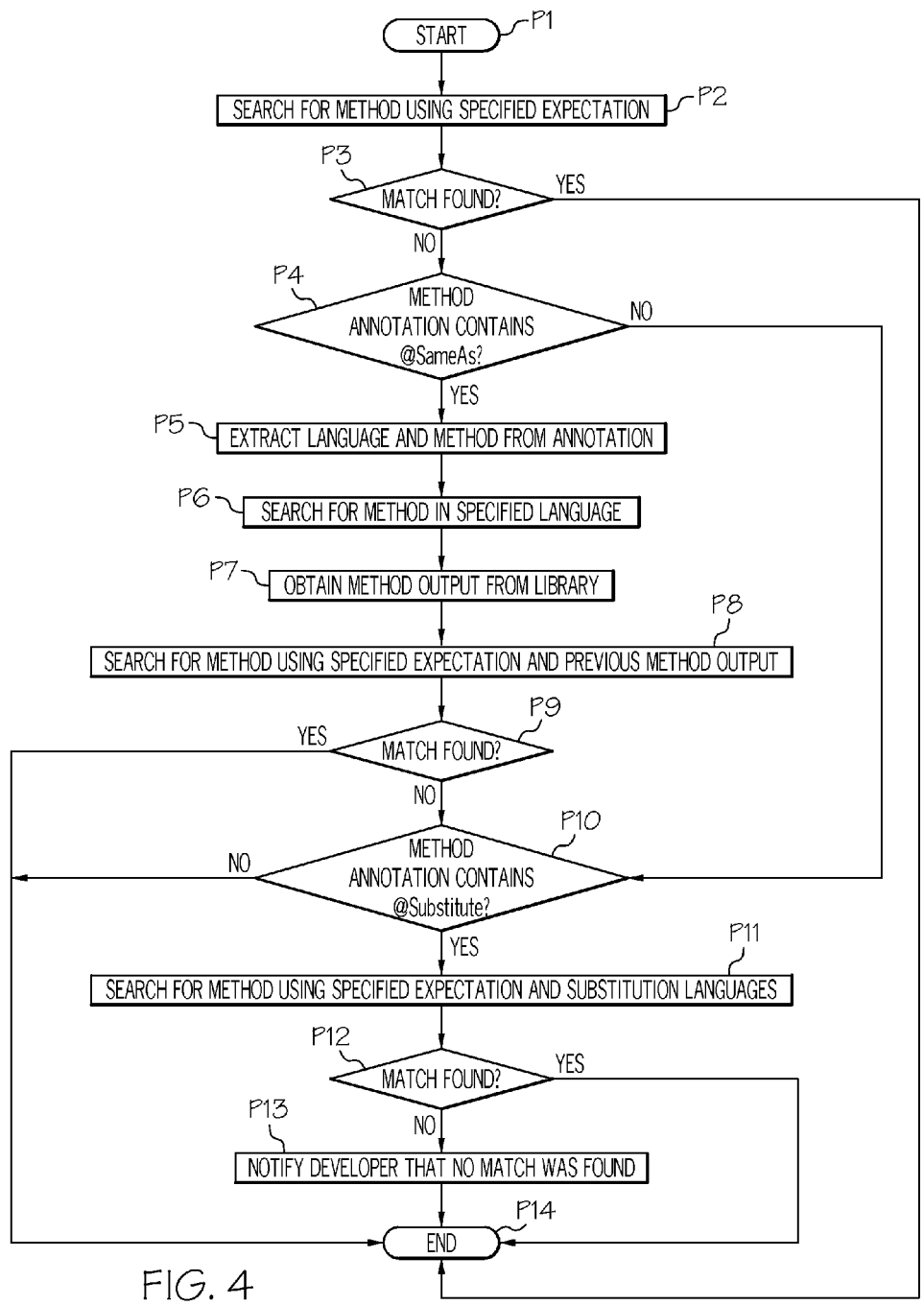
FIG. 4 depicts a method flow diagram according to an embodiment of the present invention.

Referring now to FIG. 4, a method flow diagram according to an embodiment of the present invention is shown. The process is started in step P1. In step P2, a search for a method/library using a specified expectation/language is commenced. Such a search can be performed using multiple techniques. In step P3, it is determined if a match is found. If so, the process may end in step P14. If not, it is determined in step P4 if the method/request annotation contains a "@SameAs" notation (indicating a same language match being requested). If not, the process flows to step P10. If so, a program code language and method are extracted from the annotation in step P5, and a search of a method in the specified language is preformed in step P6. In step P7, a method is obtained from a library, and in step P8 a search is made for a method using a specified expectation and previous method output (step P7). In step P9, it is determined if a match is found. If so, the process may end in step P14. If not, it is determined in step P10 if the method annotation contains a "@Substitute" notation (indicating an alternate language match being acceptable). If not, the process ends in step P14. If so, a search is conducted for a method using the specified expectation and substitute program code language(s) in step P11. In step P12, it is determined whether a match can be found. If so, the process ends in step P14. If not, a developer requesting a method/program code library is notified in step P13 before the process is ended in step P14.

Figure 5:
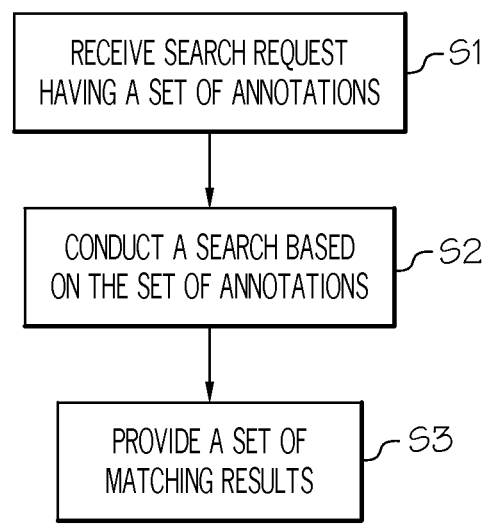
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, a request to search at least one program code library repository associated with an integrated development environment (IDE) for a program code library is received. The request generally comprises a set of annotations corresponding to at least one of: a primary program code language of the program code library, an alternate program code language, or a method pair. In step S2, a search of the at least one program code library repository for the program code library is conducted based on the set of annotations. In step S3, a set of matching search results is provided based on the search to a device hosting the IDE.

While shown and described herein as an IDE-based program code library searching and selection solution, it is understood that the invention further provides various alternative embodiments. For example, in one embodiment, the invention provides a computer-readable/useable medium that includes computer program code to enable a computer infrastructure to provide IDE-based program code library searching and selection as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide IDE-based program code library searching and selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for IDE-based program code library searching and selection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for searching for program code libraries in multiple programming languages in a networked computing environment, comprising:
   receiving, in a computer memory medium, a request to search at least one program code library repository associated with an integrated development environment (IDE) for a program code library, the request comprising a set of annotations corresponding to at least a plurality of: a primary program code language of the program code library, an alternate program code language of the program code library, or a method pair associated with the program code library;
   searching, based on the set of annotations, the at least one program code library repository for the program code library; and
   providing, based on the searching, a set of matching search results to a device hosting the IDE.

2. The computer-implemented method of claim 1, the set of matching search results comprising a set of methods.

3. The computer-implemented method of claim 1, the set of matching search results comprising a set of program code libraries.

4. The computer-implemented method of claim 1, the searching comprising parsing the set of annotations.

5. The computer-implemented method of claim 1, the searching comprising searching a first program code library having program code libraries in the primary program code language.

6. The computer-implemented method of claim 5, the searching further comprising, in response to the search of the first program code library yielding no match, searching a second program code library having program code libraries in the alternate program code language.

7. The computer-implemented method of claim 1, the networked computing environment comprising a cloud computing environment.

8. A system for searching for program code libraries in multiple programming languages in a networked computing environment, comprising:
 a memory medium comprising instructions;
 a bus coupled to the memory medium; and
 a processor coupled to the bus that when executing the instructions causes the system to:
  receive, in a computer memory medium, a request to search at least one program code library repository associated with an integrated development environment (IDE) for a program code library, the request comprising a set of annotations corresponding to at least a plurality of: a primary program code language of the program code library, an alternate program code language of the program code library, or a method pair associated with the program code library;
  search, based on the set of annotations, the at least one program code library repository for the program code library; and
  provide, based on the search, a set of matching search results to a device hosting the IDE.

9. The system of claim 8, the set of matching search results comprising a set of methods.

10. The system of claim 8, the set of matching search results comprising a set of program code libraries.

11. The system of claim 8, the memory medium further comprising instructions for causing the system to parse the set of annotations.

12. The system of claim 8, the memory medium further comprising instructions for causing the system to search a first program code library having program code libraries in the primary program code language.

13. The system of claim 12, the memory medium further comprising instructions for causing the system to, in response to the search of the first Program code library yielding no match, search a second program code library having program code libraries in the alternate program code language.

14. The system of claim 8, the networked computing environment comprising a cloud computing environment.

15. A computer program product for searching for program code libraries in multiple programming languages in a networked computing environment, the computer program product comprising a computer readable storage media, and program instructions stored on the computer readable storage media, to:
 receive, in a computer memory medium, a request to search at least one program code library repository associated with an integrated development environment (IDE) for a program code library, the request comprising a set of annotations corresponding to at least a plurality of: a primary program code language of the program code library, an alternate program code language of the program code library, or a method pair associated with the program code library;
 search, based on the set of annotations, the at least one program code library repository for the program code library; and
 provide, based on the search, a set of matching search results to a device hosting the IDE.

16. The computer program product of claim 15, the set of matching search results comprising a set of methods.

17. The computer program product of claim 15, the set of matching search results comprising a set of program code libraries.

18. The computer program product of claim 15, the computer readable storage media further comprising instructions to parse the set of annotations.

19. The computer program product of claim 15, the computer readable storage media further comprising instructions to search a first program code library having program code libraries in the primary program code language.

20. The computer program product of claim 19, the computer readable storage media further comprising instructions to, in response to the search of the first Program code library yielding no match, search a second program code library having program code libraries in the alternate program code language.

21. The computer program product of claim 15, the networked computing environment comprising a cloud computing environment.

22. A method for deploying a system for searching for program code libraries in multiple programming languages in a networked computing environment, comprising:
 providing a computer infrastructure being operable to:
  receive, in a computer memory medium, a request to search at least one program code library repository associated with an integrated development environment (IDE) for a program code library, the request comprising a set of annotations corresponding to at least a plurality of: a primary program code language of the program code library, an alternate program code language of the program code library, or a method pair associated with the program code library;
  search, based on the set of annotations, the at least one program code library repository for the program code library; and
  provide, based on the search, a set of matching search results to a device hosting the IDE.

* * * * *